US011780465B2

(12) United States Patent
Gummadi et al.

(10) Patent No.: US 11,780,465 B2
(45) Date of Patent: *Oct. 10, 2023

(54) SYSTEM AND METHOD FOR FREE SPACE ESTIMATION

(71) Applicant: DEKA Products Limited Partnership, Manchester, NH (US)

(72) Inventors: Raajitha Gummadi, Manchester, NH (US); Christopher C. Langenfeld, Nashua, NH (US); Michael J. Slate, Merrimack, NH (US); Christopher J. Principe, Nahant, MA (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,331

(22) Filed: Sep. 23, 2022

(65) Prior Publication Data
US 2023/0016896 A1 Jan. 19, 2023

Related U.S. Application Data

(63) Continuation of application No. 16/925,855, filed on Jul. 10, 2020, now Pat. No. 11,455,806.
(Continued)

(51) Int. Cl.
*G06K 9/00* (2022.01)
*B60W 60/00* (2020.01)
(Continued)

(52) U.S. Cl.
CPC ....... *B60W 60/0011* (2020.02); *G05D 1/0088* (2013.01); *G05D 1/0251* (2013.01); *G06F 18/2415* (2023.01); *G06T 7/33* (2017.01); *G06V 10/7715* (2022.01); *G06V 20/58* (2022.01); *G06V 20/588* (2022.01);
(Continued)

(58) Field of Classification Search
CPC .. G06V 20/58; G06V 20/588; G06V 2201/12; G05D 1/0088; G05D 1/0251; G05D 2201/0213; G06K 9/6277; G06K 9/6232; G06T 7/33; G06T 2207/10028; G06T 2207/30256; G06T 2207/30261;
(Continued)

(56) References Cited

U.S. PATENT DOCUMENTS 10,839,530 B1   11/2020   Berger et al.
10,921,817 B1   2/2021    Kangaspunta
(Continued)

OTHER PUBLICATIONS

Written Opinion dated Nov. 12, 2020, issued in PCT International Patent Application No. PCT/US2020/043601, 8 pages.
(Continued)

*Primary Examiner* — Dhaval V Patel
(74) *Attorney, Agent, or Firm* — William A. Bonk, III

(57) ABSTRACT

A system and method for estimating free space including applying a machine learning model to camera images of a navigation area, where the navigation area is broken into cells, synchronizing point cloud data from the navigation area with the processed camera images, and associating probabilities that the cell is occupied and object classifications of objects that could occupy the cells with cells in the navigation area based on sensor data, sensor noise, and the machine learning model.

25 Claims, 11 Drawing Sheets

Related U.S. Application Data

(60) Provisional application No. 62/872,583, filed on Jul. 10, 2019.

(51) Int. Cl.
| | |
|---|---|
| *G06T 7/33* | (2017.01) |
| *G05D 1/00* | (2006.01) |
| *G05D 1/02* | (2020.01) |
| *G06V 20/58* | (2022.01) |
| *G06V 20/56* | (2022.01) |
| *G06F 18/2415* | (2023.01) |
| *G06V 10/77* | (2022.01) |
| *G01S 17/894* | (2020.01) |

(52) U.S. Cl.
CPC .... *G01S 17/894* (2020.01); *G05D 2201/0213* (2013.01); *G06T 2207/10028* (2013.01); *G06T 2207/30256* (2013.01); *G06T 2207/30261* (2013.01)

(58) Field of Classification Search
CPC ........ G01S 17/894; G01S 17/87; G01S 17/89; G01S 17/931; B60W 60/0011
See application file for complete search history.

(56) References Cited

U.S. PATENT DOCUMENTS

| | | | |
|---|---|---|---|
| 10,970,871 | B2 | 4/2021 | Nezhadarya et al. |
| 11,004,202 | B2 | 5/2021 | Tchapmi et al. |
| 11,004,261 | B2 | 5/2021 | Yao et al. |
| 11,062,454 | B1 | 7/2021 | Cohen et al. |
| 11,537,139 | B2* | 12/2022 | Rankawat ............... G06V 20/58 |
| 2018/0101720 | A1* | 4/2018 | Liu ....................... G06V 20/647 |
| 2018/0196139 | A1* | 7/2018 | Brown .................... G01S 17/10 |
| 2019/0188541 | A1* | 6/2019 | Wang ....................... G01C 3/08 |
| 2019/0324148 | A1* | 10/2019 | Kim ........................ G01S 17/89 |
| 2020/0191971 | A1 | 6/2020 | Hua et al. |
| 2021/0012120 | A1 | 1/2021 | Gummadi et al. |
| 2021/0373161 | A1 | 12/2021 | Lu et al. |

OTHER PUBLICATIONS

Borgmann et al., Usage of Multiple LiDAR Sensors on a Mobile System for the Detection of Persons with Implicit Shape Models, The International Archives of the Photogrammetry, Remote Sensing an Spatial Information Sciences, vol. XLII-2, 2018, Jun. 4-7, 2018, Italy, 7 pages.

Chen et al., Transforming a 3-D LiDAR Point Cloud Into a 2-D Dense Depth Map Through a Parameter Self-Adaptive Framework, IEEE Transactions of the Intelligent Transportation Systems, IEEE Transactions on Intelligent Transportation Systems, vol. 18:1, pp. 165-176, 12 pages, Jan. 2017.

Choy et al., Enriching Object Detection with 2D-3D Registration and Continuous Viewpoint Estimation, 2015 IEEE Conference on Computer Vision and Pattern Recognition (CVPR), pp. 2512-2520, 9 pages, 2015.

De Silva et al., Robust Fusion of LiDAR and Wide-Angle Camera Data for Autonomous Mobile Robots, Institute for Digital Technologies, Loughborough University, London E15 2GZ, Uk, Aug. 20, 2018, 21 pages.

Harakeh, Towards Fully Self-Supervised Free Space Estimation for Unmanned Ground Vehicles, A Thesis, American University of Beirut, Beirut, Lebanon, Apr. 2016, 58 pages.

Harms et al., Grid Map based Free Space Estimation using Stereo Vision, Institute of Measurement and Control Systems, Karlsruhe Institute of Technology, Karlsruhe Germany, 2015, 2 pages.

He et al., A Novel Way to Organize 3D LiDAR Point Cloud as 2D Depth Map Height Map and Surface Normal Map, 2015 IEEE International Conference on Robotics and Biomimetics (ROBIO), pp. 1383-1388, Dec. 6-9, 2015, 6 pages.

Huang et al., A Practical Point Cloud Based Road Curb Detection Method for Autonomous Vehicle, sss.mdpi.com/journal/information, Information 2017, 8, 93, Jul. 30, 2017, 24 pages.

Kim et al., Design and Implementation of Ground Plane Detection using Predefined Datasets and Space Geometric Analysis, Journal of Semiconductor Technology and Science, vol. 18, No. 4, Aug. 2018, 9 pages.

Kocić et al., Sensors and Sensor Fusion in Autonomous Vehicles, 2018 26th Telecommunications Forum (TELFOR), Nov. 20-21, pp. 420-425, 2018, 5 pages.

Li et al., Light-Head R-CNN: In Defense of Two-Stage Object Detector, arXiv: 1711.07264 [cs.CV], Nov. 23, 2017, 9 pages.

Open CV, Open Source Computer Vision—Camera Calibration with Open CV, doxygen, Mar. 29, 2019, https://docs.opencv.org/3.4.6/d4/d94/tutorial_camera_calibration.html, 16 pages.

ROS.org, How to Calibrate a Monocular Camera, Open Source Robotics Foundation, Apr. 20, 2017, http://wiki.ros.org/camera calibration/Tutorials/MonocularCalibration, 8 pages.

Park et al., Calibration between Color Camera and 3D LiDAR Instruments with a Polygonal Planar Board, Sensors ISSN 1424-8220, vol. 14:5333-5353, Mar. 17, 2014, 21 pages.

Rodríguez-Cuenca et al., Morphological Operations to Extract Urban Curbs in 3D MLS Point Clouds, International Journal of Geo-Information, Jun. 14, 2016, 17 pages.

Sahdev, Free Space Estimation using Occupancy Grids and Dynamic Object Detection, arXiv:1708.04989 [cs.CV], https://arxiv.org/abs/1708.04989, Aug. 16, 2017, 10 pages.

Free_Space_Estimation_for_Autonomous_Navigation, 2007, Bielefeld, Germany, 11 pages.

Velas et al., Calibration of RGB Camera with Velodyne LiDAR, WSCG2014 Conference on Computer Graphics, Visualization and Computer Vision, 2014, 10 pages.

Velodyne LiDAR-VLP-32C User Manual 63-9325 Rev. B, 2018, 136 pages.

Wang, Semantic Segmentation, Machine Learning Group, University of Toronto, https://www.cs.toronto.edu/~tingwuwang/semantic_segmentation.pdf, 2017.

Xiao et al., Gaussian process regression-based robust free space detection for autonomous vehicle by 3-D point cloud and 2-D appearance information fusion, International Journal of Advanced Robotic Systems, Jul.-Aug. 2017, 20 pages.

Yao et al., Estimating Drivable Collision-Free Space for Monocular Video, Mitsubishi Electric Research Laboratories, IEEE Winter Conference on Applications of Computer Vision, pp. 420-427, Jan. 6, 2015, 9 pages.

\* cited by examiner

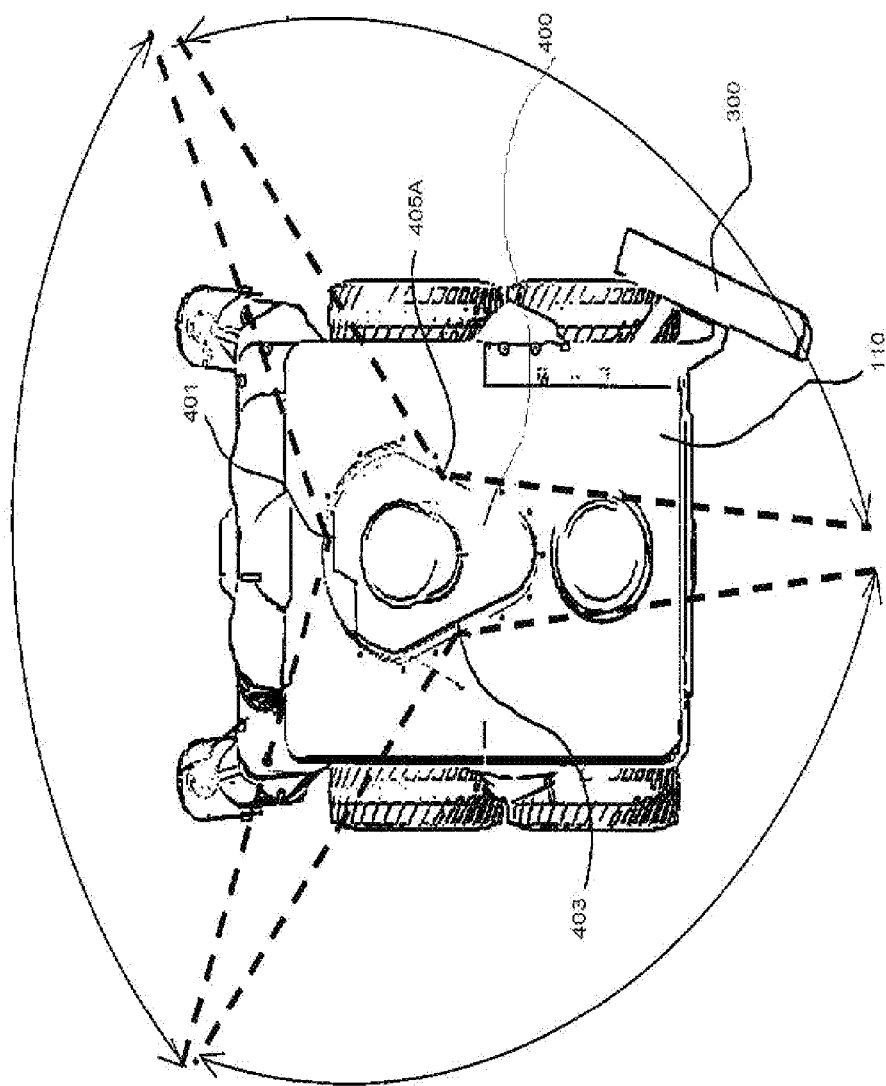

SYSTEM AND METHOD FOR FREE SPACE ESTIMATION

CROSS REFERENCE TO RELATED APPLICATIONS

This utility patent application is a continuation of U.S. patent application Ser. No. 16/925,855 filed Jul. 10, 2020, entitled System and Method for Free Space Estimation, now U.S. Pat. No. 11,455,806, issued Sep. 27, 2022 which claims the benefit of U.S. Provisional Patent Application Ser. No. 62/872,583 filed Jul. 10, 2019, entitled System and Method for Free Space Estimation, all of which are incorporated herein by reference in their entirety.

BACKGROUND

Various methods for organizing 3D LIDAR point cloud data as a 2D depth map, height map, and surface normal map exist. What is needed is a system that applies a machine learning model to camera images of a navigation area, where the navigation area is broken into cells, synchronizes point cloud data from the navigation area with the processed camera images, and associates probabilities that the cell is occupied and object classifications of objects that could occupy the cells with cells in the navigation area based on sensor data, sensor noise, and the machine learning model.

SUMMARY

The method of the present teachings for estimating free space based on image data and point cloud data, the free space used for navigating an autonomous vehicle, the method can include, but is not limited to including, receiving camera image data and point cloud data into the autonomous vehicle, semantically classifying the image data based on a machine learning model forming point classifications and point classification probabilities, and associating each point in the point cloud data to the image data that are spatially co-located with the point cloud data. The method can include performing a first transform on the points in the point cloud data into an image coordinate system associated with the image data and classifying each of the first transformed points that represents an obstructed space and the non-obstructed space based on a spatial association of the first transformed points with the semantically classified image data forming obstructed points and non-obstructed points. The method can include performing a second transform on the first transformed points into a robot coordinate system associated with the autonomous vehicle, and classifying each of the second transformed points that represents a non-obstructed space and an obstructed space within a pre-selected area surrounding the autonomous vehicle. The classifying can form a grid of obstructed and non-obstructed space based on spatial association of the first transformed points with the semantically classified image data having the point classifications and the point probabilities. The method can include associating the obstructed points with a first probability based at least on (a) noise in the point cloud data, (b) a second probability that the point cloud data are reliable, and (c) a third probability that the point classifications are correct, and estimating the free space in the pre-selected area by computing a fourth probability based at least on (1) noise in the point cloud data, (2) the second probability, (3) the distance from the non-obstructed points to the obstructed space closest to the non-obstructed points, (4) the third probability, and (5) presence of non-obstructed space.

The camera image data can optionally include streaming data from a pre-selected number of cameras, the at least one camera providing a 360° view of an area surrounding the autonomous vehicle. The at least one camera can optionally include providing the image data through a MIPI interface at a pre-selected resolution. The pre-selected resolution can optionally include 2180×720 pixels. The machine learning model can optionally include an ICNET semantic segmentation model. The machine learning model can optionally include detecting at least one drivable surface. The at least one drivable surface can optionally include road, sidewalk, ground, terrain surfaces, and lane markings. The associating each point can optionally include receiving the image data at a pre-selected rate, and mapping the point cloud data onto the image data.

The system of the present teachings for estimating free space based on image data and point cloud data, where the free space can be used for navigating an autonomous vehicle, and where the autonomous vehicle can include a front, a left side, and a right side, the system can include, but is not limited to including, a pre-processor receiving camera image data from at least one camera into the autonomous vehicle. The pre-processor can semantically classify each pixel of the image data into a classification, and can calculate a probability associated with the classification. The classification and the probability can be determined by a machine learning model. The system can include a free space estimator that can include, but is not limited to including, a 3D point cloud to 3D image processor transforming the 3D point cloud to 3D image coordinates, a 3D image to 2D RGB transform transforming the 3D image coordinates to 2D RGB coordinates, a 2D to 3D baselink transform transforming the 2D RGB coordinates to 3D baselink coordinates, and a layer processor computing obstacle classification, probability, and log odds layers based on the processing point cloud and image data.

The camera image data can optionally include streaming data from at least one camera. The at least one camera can optionally provide a 360° view of an area surrounding the autonomous vehicle. The number of cameras can optionally include three or four. The machine learning model can optionally include detecting drivable surfaces, and the drivable surfaces can optionally include lane markings. The lane markings can optionally include solid white lines, broken white lines, yellow lines and cross walks, and can optionally indicate travel in the direction of the autonomous vehicle. The point cloud data can optionally include LIDAR data. The free space estimator can optionally include receiving data having time stamps into a synchronizer. The synchronizer can optionally include time-synchronizing the point cloud data, the transform data, and the classifications based on the time stamps. The time stamps can optionally include marking a time when a data block is acquired from a sensor or a transform manager. The 3D point cloud to 3D image processor can optionally include receiving the point cloud data from at least one LIDAR sensor, the classifications and the probabilities, and coordinate transforms, associating each point in the point cloud data to the image data that are spatially co-located with the point cloud data, and performing a first transform on the points in the point cloud data into an image coordinate system associated with the image data. The associating each point in the synchronized point cloud data with the synchronized image data can optionally include, for each point (X,Y,Z) in the synchronized point cloud data, calculating an angle that the point subtends with a center of the synchronized point cloud data, the angle indicating a field of view of the at least one camera. The calculating can optionally include, if X>0 and Y>0 then the angle=0°+atan(Y/X) degrees*180/π, if X<0 and Y>0 then the angle=90°−atan(X/Y) degrees*180/π, if X<0 and Y<0 then the angle=180°+atan(Y/X) degrees*180/π, and if X>0 and Y<0 then the angle=270°−atan(X/Y) degrees*180/π. The associating can optionally include mapping each point onto the semantic segmentation output image that can optionally include, if 312°<the angle≤360° or 48°≥the angle>0°, then mapping the point onto the semantic segmentation output image derived from the at least one camera located at the front of the autonomous vehicle, or, if 48°<the angle<180°, then mapping the point onto the semantic segmentation output image derived from the at least one camera located on the left side, and, if 180°<the angle≤312°, then mapping the point onto the semantic segmentation output image derived from the at least one camera located on the right side. The 3D image to 2D RGB transform can optionally include identifying each of the first transformed points that represents an obstructed space and a non-obstructed space based on a spatial association of the first transformed points with the semantically classified image data. The 2D to 3D baselink transform can optionally include performing a second transform on the first transformed points into a robot coordinate system associated with the autonomous vehicle. The 3D baselink to grid transform can optionally include flattening the robot coordinate system points (Xbl, Ybl, Zbl) to a 2D grid map surrounding the autonomous device. The 2D grid map can optionally extend to a pre-selected radius around the autonomous device. The 3D baselink to grid transform can optionally include identifying a cell of the 2D grip map as occupied if a semantic segmentation output point (XRGB, YRGB), of the semantic segmentation output image, spatially associated with the cell, corresponds to an obstructed space. The pre-selected radius can optionally include about 20 m. The semantic segmentation output point (XRGB, YRGB) can optionally include values including 0=non-drivable, 1=road, 2=sidewalk, 3=terrain, 4=lane marking, >0=drivable, 0=obstructed. The obstructed space can optionally include at least one surface being impassable by a vehicle. The vehicle can optionally include a wheelchair, a bicycle, or a car sized vehicle. The layer processor can optionally include classifying each of the second transformed points that represents a non-obstructed space and an obstructed space within a pre-selected area surrounding the autonomous vehicle. The classifying can optionally form a grid of obstructed and non-obstructed space, based on spatial association of the first transformed points with the semantically classified image data having the point classifications and the point probabilities. The layer processor can optionally include associating the obstructed points with a first probability based at least on (a) noise in the point cloud data, (b) a second probability that the point cloud data are reliable, and (c) a third probability that the point classifications are correct, and estimating the free space in the pre-selected area by computing a fourth probability based at least on (1) noise in the point cloud data, (2) the second probability, (3) the distance from the non-obstructed points to the obstructed space closest to the non-obstructed points, (4) the third probability, and (5) presence of non-obstructed space. The non-obstructed space can optionally include space that is not part of the obstructed space. The layer processor can optionally include estimating the free space by extending a line from a center of the grid map to the boundary of the pre-selected area, and, along the line, marking the free space as the cells that are not the obstructed space in the grid map between a blind area and the last free space present in the line. The blind area can optionally include an area surrounding the LIDAR sensor where the point cloud data cannot be gathered.

The method of the present teachings for mapping point cloud data from at least one LIDAR sensor onto semantically segmented image data from a plurality of cameras, the at least one LIDAR sensor and the plurality of cameras being located upon an autonomous vehicle, the method can include, but is not limited to including, accessing a synchronizer. The synchronizer can provide time synchronized point cloud data and the semantically segmented image data that are based on the time stamps on point cloud data and semantically segmented image data that are received simultaneously, forming time-synchronized point cloud data from the time stamped point cloud data and time-synchronized semantically segmented image data from the time stamped semantically segmented image data. The method can include receiving time-synchronized point cloud data and the time-synchronized semantically segmented image data from the plurality of cameras, the plurality of cameras being mounted on a front of the autonomous vehicle, on a left side of the autonomous vehicle, and on an opposing right side of the autonomous vehicle. The method can include translating the time-synchronized point cloud data from a LIDAR coordinate system associated with the at least one LIDAR sensor to an image coordinate system associated with the at least one camera. The translating can include applying a roll of −90° and a yaw of −90° to the point cloud data, the rotation producing rotated point cloud data in a 3D frame of reference according to a rotation matrix R, converting the LIDAR points associated with the aligned LIDAR frame of reference to 3D image points by applying the translation matrix R and camera translation factors tx/ty/tz to the rotated point cloud data, and applying camera rotation matrices r to the rotated point cloud data to align a LIDAR frame of reference of the at least one LIDAR sensors with a camera frame of reference associated with the at least one camera. The translating can include accessing a calibration matrix K associated with the at least one camera, applying the calibration matrix K to the 3D image points forming calibrated 3D image points (x,y,z), and converting the calibrated 3D image points (x,y,z) to 2D points (Xrgb,Yrgb) wherein Xrgb=x/z, Yrgb=y/z. The method can include providing each of 2D points (Xrgb,Yrgb) a depth value of a LIDAR point that is closest to the autonomous vehicle.

Computing the translation matrix R can optionally include computing Euler and Tait-Bryan rotations as a combined rotation matrix of 3-axis rotation matrices (Rx, Ry,Rz). The combined rotation matrix can be a product of two or three of the rotation matrices (Rx,Ry,Rz). Computing the translation matrices r can optionally include, for each point (X,Y,Z) in the point cloud data, calculating an angle that the point (X,Y,Z) subtends with a center of the LIDAR sensor. If X>0 and Y>0 then the angle=0°+atan(Y/X) degrees*180/π. If X<0 and Y>0 then the angle=90°−atan(X/Y) degrees*180/π. If X<0 and Y<0 then the angle=180°+atan(Y/X) degrees*180/π. If X>0 and Y<0 then the angle=270°−atan(X/Y) degrees*180/π. If 312°≤the angle≤360° or 48°≥the angle>0°, computing the translation matrices r can optionally include mapping the point (X,Y,Z) onto the semantic segmentation output image derived from the front camera. If the angle>48° and the angle<180°, computing the translation matrices r can optionally include mapping the point (X,Y,Z) onto the semantic segmentation output image derived from the left camera. If the angle>180° and angle≤312°, computing the translation matrices r can optionally include mapping the point (X,Y,Z) onto the semantic segmentation output image derived from the right camera. Computing the translation matrices r can optionally include applying a transform based at least on the angle.

BRIEF DESCRIPTION OF THE DRAWINGS

The present teachings will be more readily understood by reference to the following description, taken with the accompanying drawings, in which:

FIG. 2A is a top view of an exemplary system indicating the fields of view of the cameras of the present teachings;

DETAILED DESCRIPTION

The system and method of the present teachings can estimate the free space surrounding an autonomous vehicle in real time.

Figure 1A:
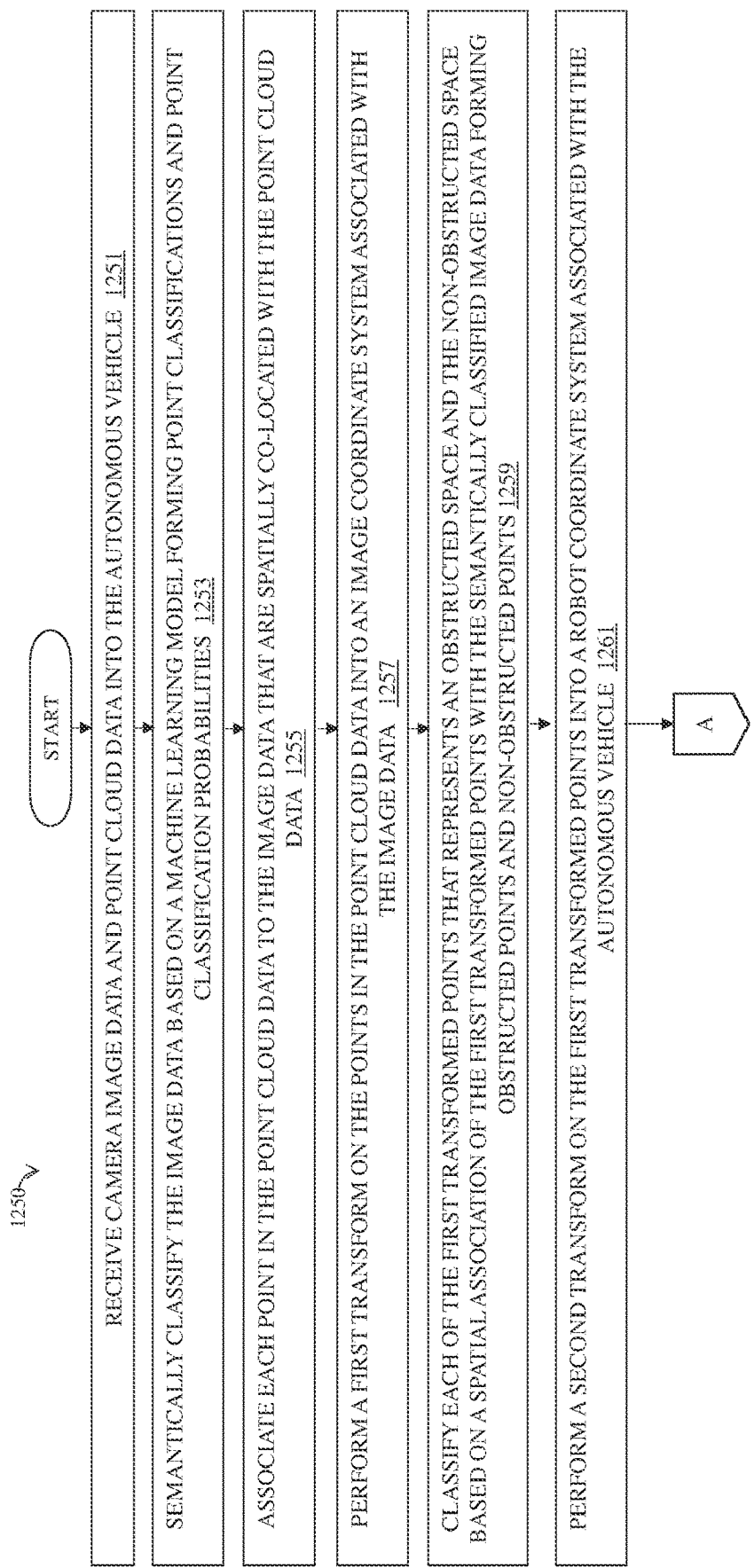
FIGS. 1A and 1B are flowcharts of the process of the present teachings.

Referring now to FIG. 1A, free space can be estimated by synchronizing and fusing data, and generating grid maps with occupancy and classification layers. Method 1250 for estimating free space around an autonomous vehicle can include, but is not limited to including, receiving 1251 camera image data and point cloud data into the autonomous vehicle, and semantically classifying 1253 each the image data based on a machine learning model, forming point classifications and point classification probabilities. Semantically classifying the image data can include developing, training, and evaluating a semantic segmentation model for real-time object detection. Such models can be acquired commercially, or they can be developed, or modifications can be made to commercial products. Commercial models can include, but are not limited to including, the ICNET semantic segmentation model in Keras with Tensorflow backend for detection of drivable surfaces, where the drivable surfaces can include, but are not limited to, road, sidewalk, ground, terrain surfaces, and lane markings.

Continuing to refer to FIG. 1A, method 1250 can include associating 1255 each point in the point cloud data with the image data that are spatially co-located with the point cloud data, and performing 1257 a first transform on the points in the point cloud data into an image coordinate system associated with the image data. Associating each point in the point cloud data with the image data can include receiving the image data at a pre-selected rate, and mapping the point cloud data onto the image data. The image data can be collected by commercial cameras, and those cameras can provide image data through, for example, but not limited to, a MIPI interface. In some configurations, the cameras can stream data as a Robot Operating System (ROS) topic at a pre-selected resolution, for example, but not limited to, 2180×720, and for 360° centered at the autonomous device.

Continuing to refer to FIG. 1A, method 1250 can include classifying 1259 each of the first transformed points that represents an obstructed space and the non-obstructed space based on a spatial association of the first transformed points with the semantically classified image data forming obstructed points and non-obstructed points, and performing 1261 a second transform on the first transformed points into a robot coordinate system associated with the autonomous vehicle. Point cloud data can be mapped onto the image data, and then further mapped to 3D coordinates of the base layer of the autonomous device.

Figure 1B:
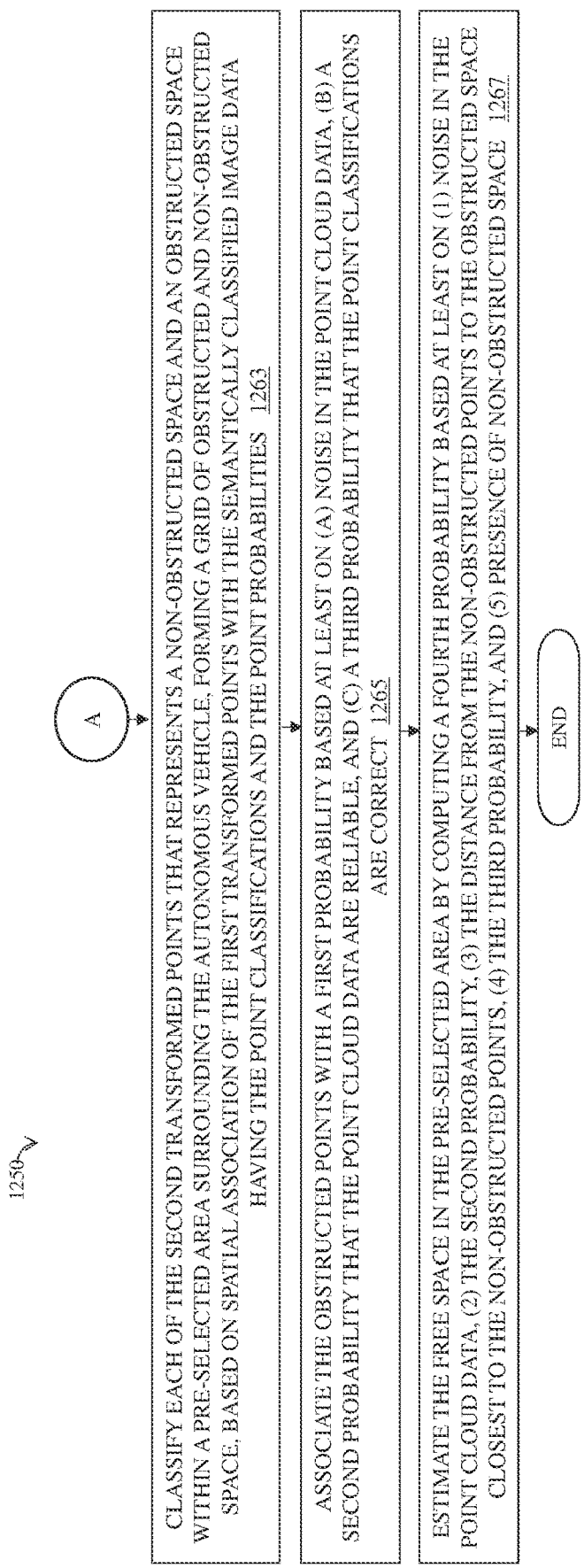

Referring now to FIG. 1B, method 1250 can include classifying 1263 each of the second transformed points that represents a non-obstructed space and an obstructed space within a pre-selected area surrounding the autonomous vehicle, forming a grid of obstructed and non-obstructed space, based on spatial association of the first transformed points with the semantically classified image data having the point classifications and the point probabilities. Non-obstructed space can be defined as any space that is not part of the obstructed space. Method 1250 can include associating 1265 the obstructed points with a first probability based at least on (a) noise in the point cloud data, (b) a second probability that the point cloud data are reliable, and (c) a third probability that the point classifications are correct. Method 1250 can include estimating 1267 the free space in the pre-selected area by computing a fourth probability based at least on (a) noise in the point cloud data, (b) the second probability, (c) the distance from the non-obstructed points to the obstructed space closest to the non-obstructed points, (4) the third probability, and (e) a presence of the non-obstructed space.

Figure 2:
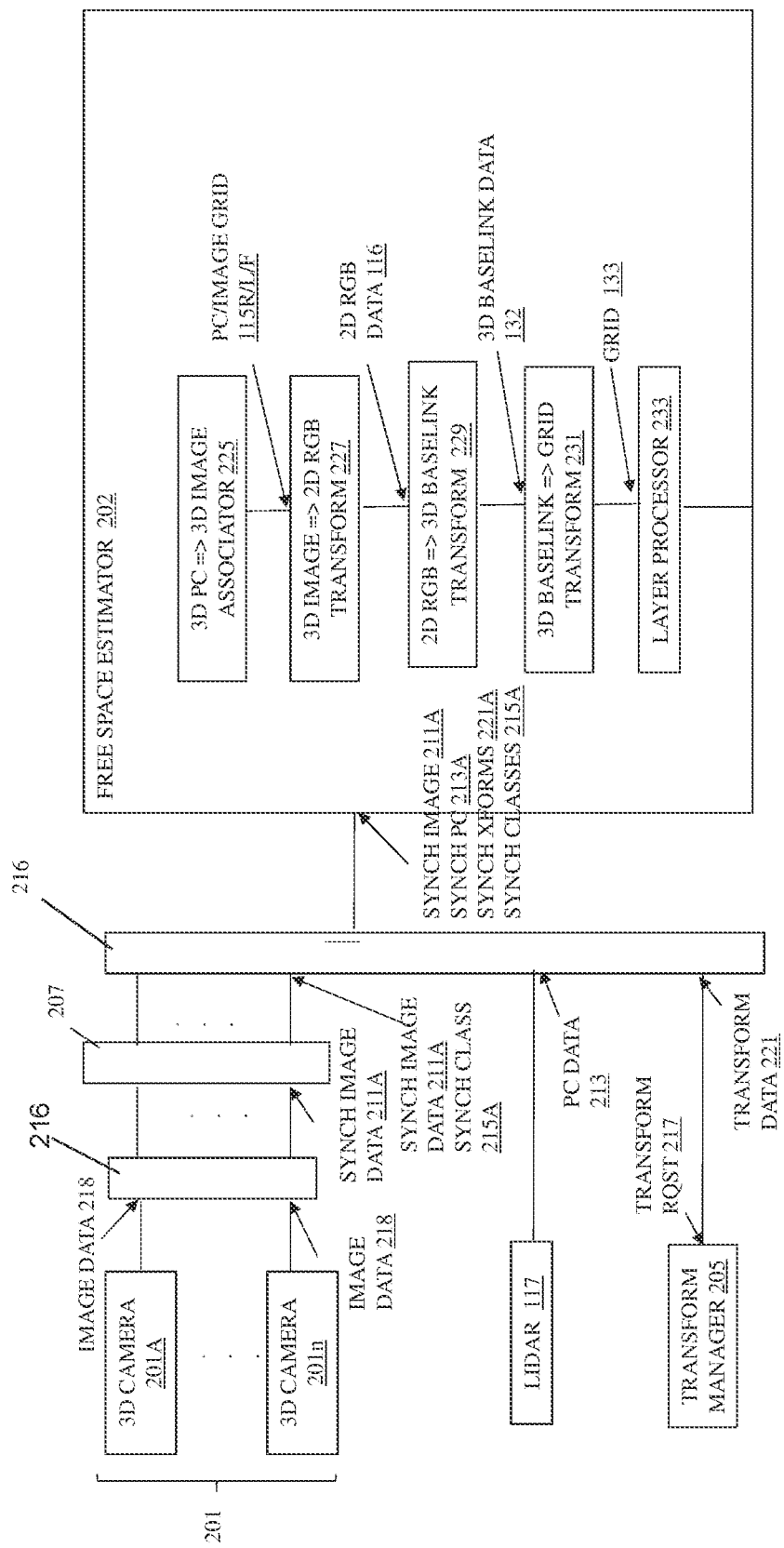
FIG. 2 is a schematic block diagram of the system of the present teachings.
Figure 3A:
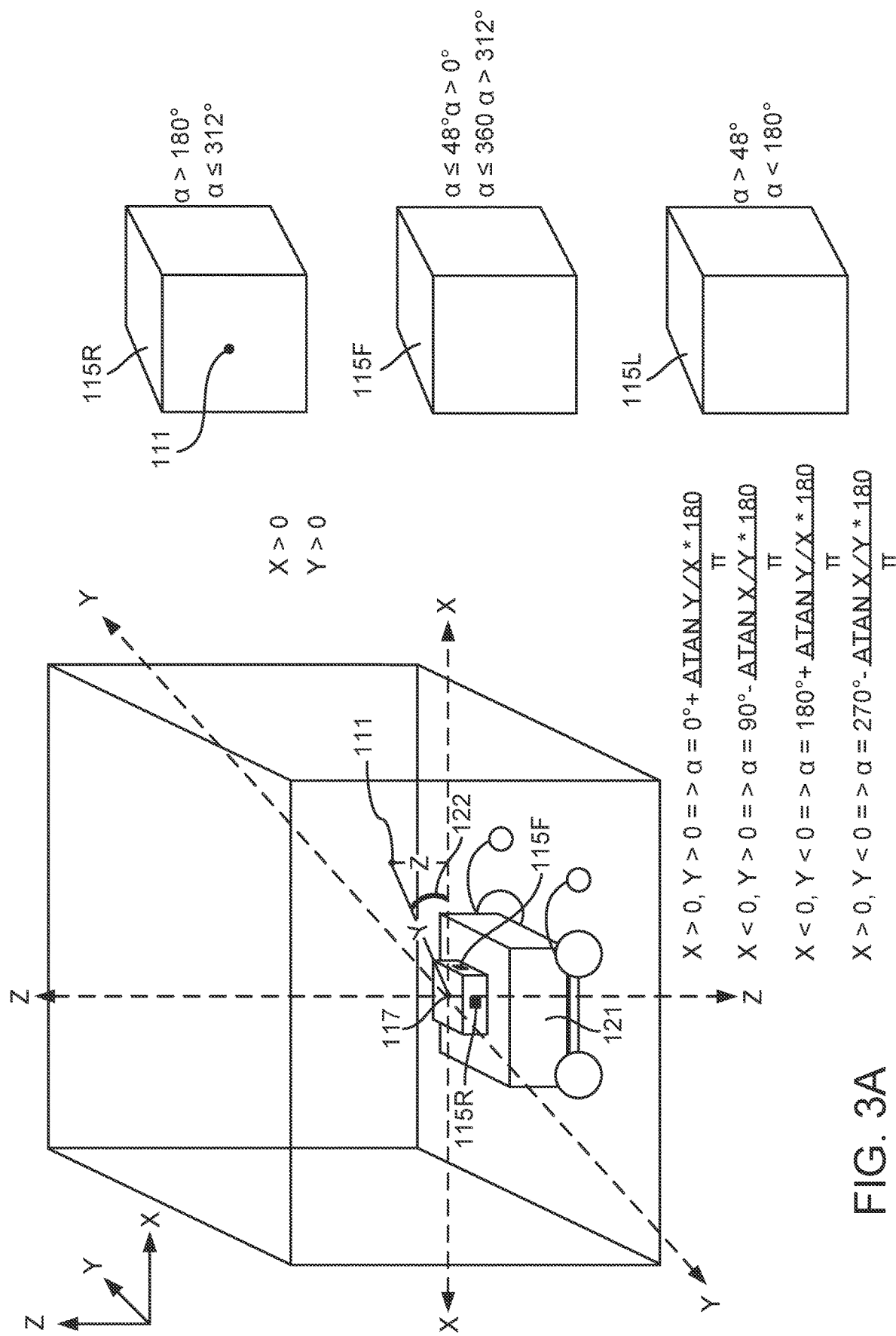
FIGS. 3A and 3B are pictorial representations of the data processing steps of the present teachings.

Referring now to FIG. 2, system 200 for estimating free space around an autonomous vehicle can include, but is not limited to including, pre-processor 207 and free space estimator 202. Pre-processor 207 can include receiving camera image data 218 from 3D cameras 201A-201n, referred to collectively as cameras 201, and a synchronizer that can time-synchronize cameras 201 to each other. Some configurations can include three of 3D cameras 201. Cameras 201 can include, but are not limited to including, MIPI cameras that can stream data at about 1280×720 resolution at about 30 Hz, and can be mounted on autonomous vehicle 121 (FIG. 3A) to provide 360° perception around autonomous vehicle 121 (FIG. 3A). Image data 218 can be semantically classified into classifications 215, where classifications 215 can be based on the training received by a machine learning model executing in pre-processor 207. The machine learning model can include a commercially-available semantic segmentation model trained for detecting specific types of features such as, for example, but not limited to, types of surfaces. Classes 215 of surfaces can include, but are not limited to including, road, sidewalk, ground, terrain surfaces, and lane markings. Lane markings can include white or yellow painted markings on the road, including solid white lines, broken white lines, yellow lines and cross walks, to indicate traffic traveling in the direction of the autonomous vehicle.

Continuing to refer to FIG. 2, pre-processor 207 can provide image data 211, classes 215, point cloud data 213 from, for example, LIDAR 203, and transforms 221 to synchronizer 216. Synchronizer 216 can time-synchronize point cloud data 213, transform data 221, classes 215, and images 211. In some configurations, synchronizer 216 can create a ROS synchronized subscriber that can insure that any data that are received simultaneously have the same time stamp. The time stamp can mark the moment of the first data point of the first data block from the sensors and/or the transform data. In some configurations, synchronizer 216 can access a commercially-available filter that can synchronize incoming data by the timestamps contained in their headers, according to either exact time or approximate time. Exact time requires the data to have exactly the same time stamps in order to match. Approximate time can use, for example, but not limited to, an adaptive algorithm to match data based on the time stamps of the data. A description of one such adaptive algorithm can be found at http://wiki.ros.org/message_filters/ApproximateTime.

Continuing to refer to FIG. 2, free space estimator 202 can include 3D-point cloud to 3D image processor 225 that can include receiving synchronized image data 211A at a pre-selected rate, and mapping point cloud data 213 onto image data 211, which includes a spatial association of points to the cameras. 3D-point cloud to 3D image processor 225 can include associating each point in synchronized point cloud data 213A with synchronized image data 211A that are spatially co-located with synchronized point cloud data 213A, and performing a first transform on synchronized point cloud data 213A into an image coordinate system associated with synchronized image data 211A. Associating each point (X,Y,Z) 111 (FIG. 3A) in synchronized point cloud data 213A with synchronized image data 211A can include for each point (X,Y,Z) 111 (FIG. 3A) in synchronized point cloud data 213A, calculating angle α 122 that point (X,Y,Z) 111 (FIG. 3A) subtends with center 117 (FIG. 3A) of synchronized point cloud data 213A as follows:

X>0 and Y>0 ➔ α=0°+atan(Y/X) degrees*180/π
X<0 and Y>0 ➔ α=90°−atan(X/Y) degrees*180/π
X<0 and Y<0 ➔ α=180°+atan(Y/X) degrees*180/π
X>0 and Y<0 ➔ α=270°−atan(X/Y) degrees*180/π

Angle α 122 indicates the field of view of one of cameras 201. The field of view dictates which camera's semantic segmentation output image that point (X,Y,Z) 111 (FIG. 3A) is mapped onto as follows:

312°<α≤360° or 48°≥α>0° ➔ point mapped onto semantic segmentation output image derived from front camera 401 (FIG. 2A);
48°<α<180° ➔ point mapped onto semantic segmentation output image derived from left camera 403 (FIG. 2A);
180°<α≤312° ➔ point mapped onto semantic segmentation output image derived from right camera 405A (FIG. 2A).

PC/image grid 115R/L/F (a grid for each camera) can result from the computations of 3D PC ➔ 3D image associator 225.

Figure 2B:
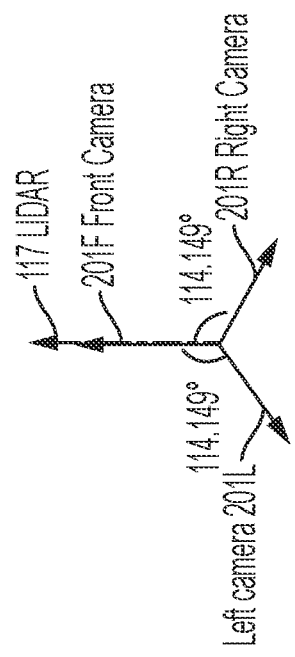
FIG. 2B is a pictorial representation of a camera configuration that can supply data to the system of the present teachings.
Figure 2B:
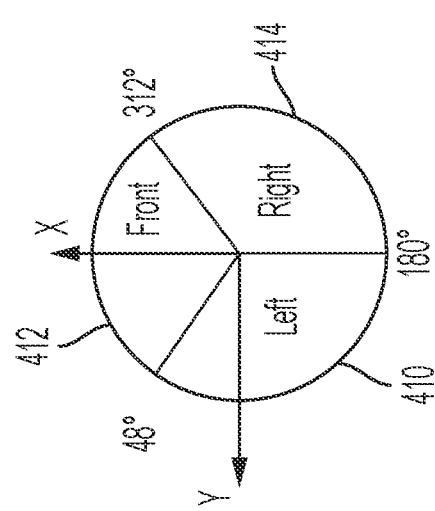
Figure 3B:
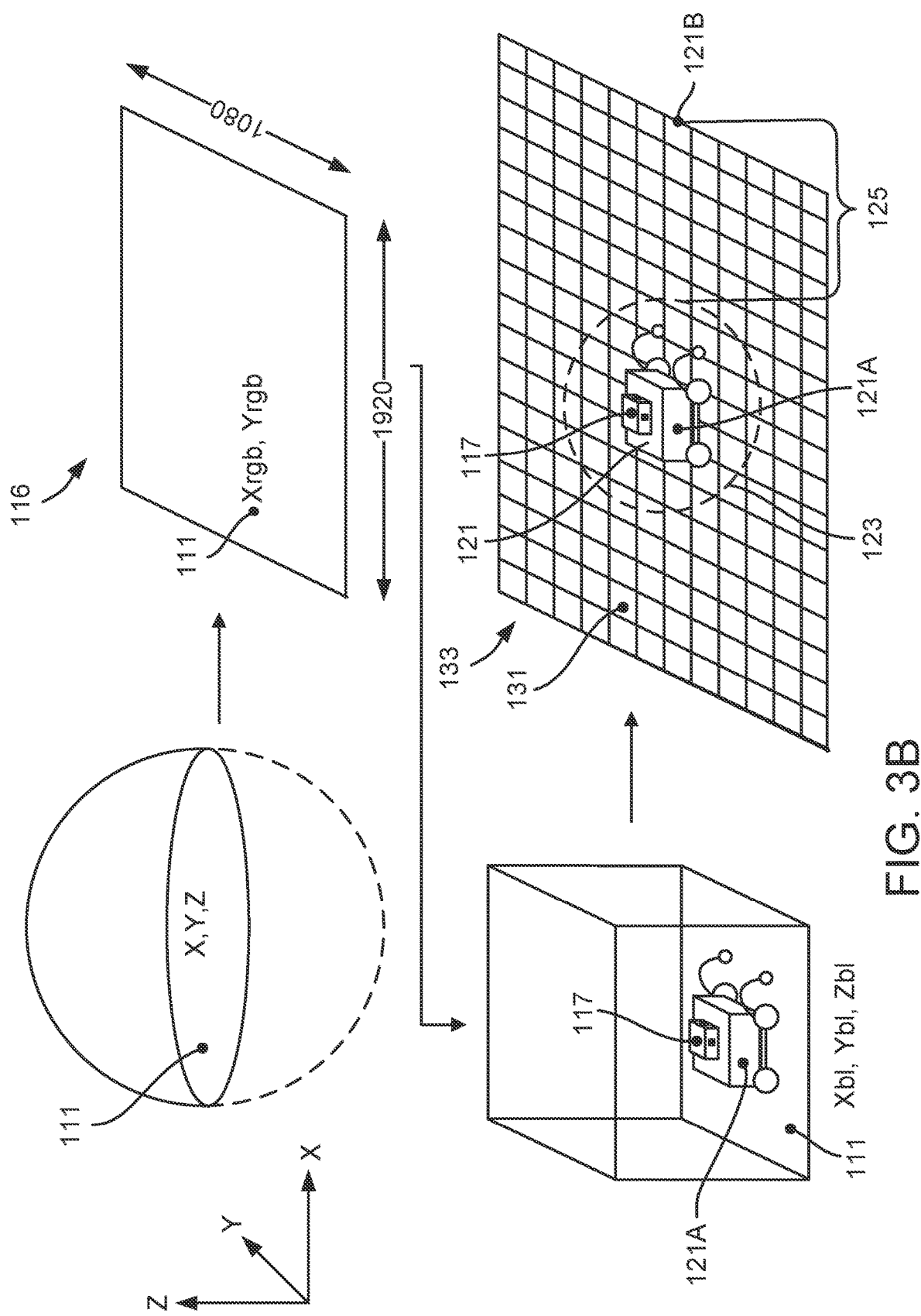
Figure 4A:
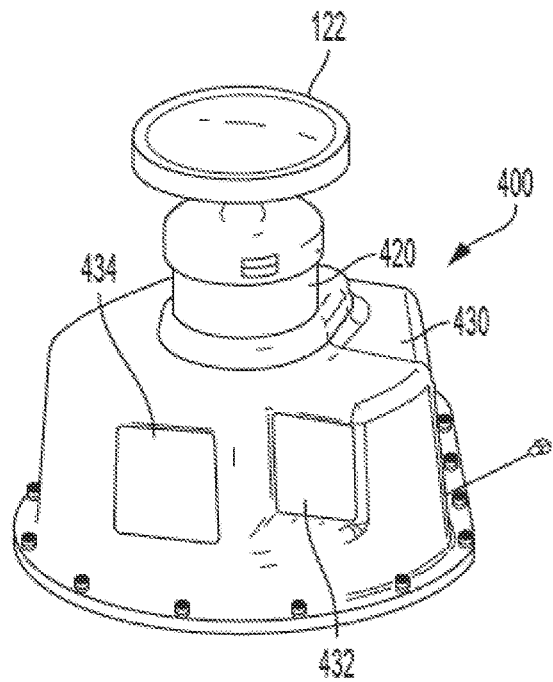
FIGS. 4A-4D are perspective diagrams of an exemplary sensor configuration of the present teachings.
Figure 4B:
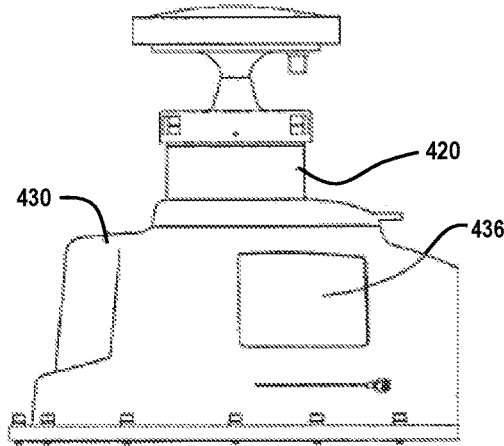
Figure 4C:
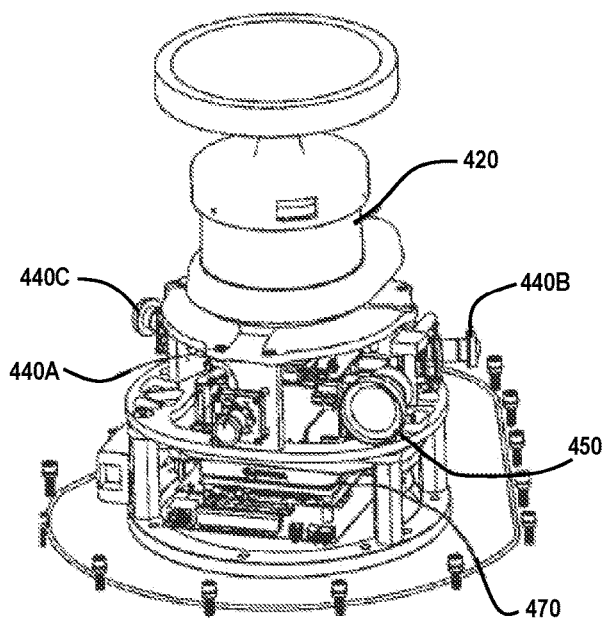
Figure 4D:
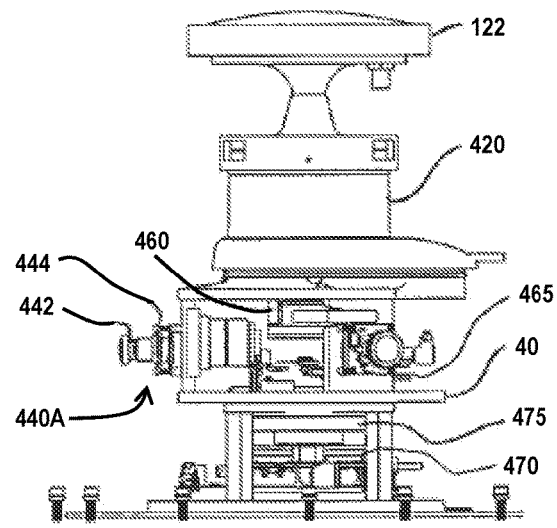

Continuing to refer to FIG. 2, 3D image to 2D RGB transform 227 can include projecting each mapped point onto a 2D image of a pre-selected size, for example, but not limited to, 1920×1080 to obtain $X_{GRB}$, $Y_{GRB}$ pixel location 111 (FIG. 3B). Because more than one mapped point could have the same $X_{GRB}$, $Y_{GRB}$ pixel location 111 (FIG. 2B), each projected $X_{GRB}$, $Y_{GRB}$ pixel location 111 (FIG. 3B) can be populated with a depth of a mapped point that is closest to autonomous vehicle 121 (FIG. 3B). 3D image to 2D RGB transform 227 can include identifying each of the first transformed points that represents an obstructed space and a non-obstructed space based on a spatial association of the first transformed points with the semantically classified image data 211A. The identified points can be termed obstructed points and non-obstructed points. 2D RGB data 116 can result from the computations of 3D image=>2D RGB transform 227.

Continuing to refer to FIG. 2, synchronized point cloud data 213A can be mapped onto synchronized image data 211A, and then further mapped to 3D coordinates of autonomous device 121. 2D to 3D baselink transform 229 can include performing a second transform on the first transformed points into robot coordinate system points ($X_{bl}$, $Y_{bl}$, $Z_{bl}$) associated with autonomous vehicle 121 (FIG. 3A) by a process relying on synchronized transforms 221A provided by transform manager 205. Synchronized classes 215A are also provided to free space estimator 202. 3D baselink to grid transform 231 can flatten robot coordinate system 3-D points ($X_{bl}$, $Y_{bl}$, $Z_{bl}$) to a 2D grid map surrounding autonomous device 121 (FIG. 3B) that can extend to a pre-selected radius, for example, but not limited to, 20 m. Cell 131 (FIG. 3B) in grid map 133 (FIG. 3B) can by identified as occupied if the semantic segmentation output also confirms that points in cell 131 (FIG. 3B) correspond to an obstructed space. Point ($X_{RGB}$, $Y_{RGB}$) 111 (FIG. 3B) in semantic segmentation's output image can include values such as, but not limited to, 0=non-drivable, 1=road, 2=sidewalk, 3=terrain, 4=lane marking, and thus, >0=drivable, 0=obstructed. Obstructed space or non-drivable surfaces can include surfaces that are impassable by a wheelchair/bicycle/car sized vehicle. 3D baselink data 132 can result from the computations of 2D RGB=>3D baselink transform 229.

Continuing to refer to FIG. 2, layer processor 233 can include classifying each of the second transformed points that represents a non-obstructed space and an obstructed space within a pre-selected area surrounding autonomous vehicle 121, forming a grid of obstructed and non-obstructed space, based on a spatial association of the first transformed points with the semantically classified image data having the point classifications and the point probabilities. Layer processor 233 can include associating the obstructed points with a first probability based at least on (a) noise in the point cloud data, (b) a second probability that the point cloud data are reliable, and (c) a third probability that the point classifications are correct. Layer processor 233 can include estimating the free space in the pre-selected area by computing a fourth probability based at least on (1) noise in the point cloud data, (2) the second probability, (3) the distance from the non-obstructed points to the obstructed space closest to the non-obstructed points, (4) the third probability, and (5) presence of non-obstructed space.

Continuing to refer to FIG. 2, after the process described herein is complete, grid map 133 includes obstructed spaces classifications, probabilities, and probability log odds. Free space can be determined by extending line 125 (FIG. 3B) from center 121A (FIG. 3B) of grid map 133 (FIG. 3B) to end-point 121B (FIG. 3B) on the boundary of the pre-selected area surrounding autonomous vehicle 121 (FIG. 3B). Along line 125 (FIG. 3B), cells 131 (FIG. 3B) that are not obstructed in grid map 133 (FIG. 3B) between blind area 123 (FIG. 3B) and the last of cells 131 (FIG. 3B) that is not obstructed or end-point 121B (FIG. 3B) can be marked as free space. Each can be associated with a Gaussian probability that marked cell is actually a free space. Blind area 123 (FIG. 3B) is an area surrounding LIDAR 117 (FIG. 2) where data cannot be gathered.

Referring now to FIGS. 2A and 2B, in some configurations, three long-range cameras, 201L, 201F, and 201R, can provide fields of view 410, 412, 414, respectively, that can together provide a 360° field of view. The field of view may be defined by camera selection, the number of cameras, and by the location of the cameras within camera assembly 400. In describing fields of view herein, the zero angle can be a ray located in a vertical plain through the center of the autonomous vehicle 121 (FIG. 3B) and perpendicular to the front of autonomous vehicle 121 (FIG. 3B). The zero angle ray can pass through the front of autonomous vehicle 121. Front camera located 201F can have a 96° field of view 412 from 312° to 360° and 0° to 48°. Left side camera 201L can have a field of view 410 from 48° to 180°. Right side camera 201R can have a field of view 414 from 180° to 312°.

Referring now to FIGS. 4A-4D, in some configurations, LIDAR 420 can provide a 360° horizontal field of view around autonomous vehicle 121 (FIG. 3B). In some configurations, the vertical field of view is 40° and, for example, mounted at 1.2 meters above the ground, can set the minimum distance at which LIDAR 420 can detect data at about four meters from autonomous vehicle 121 (FIG. 3B). Sensor assembly 400 can include cover 430 to protect assembly electronics from wear and tear. LIDAR 420 can provide data on the range or distance to surfaces around autonomous vehicle 121 (FIG. 3B). In some configurations, processor 470 can processor the data from LIDAR 420. LIDAR 420 can be mounted on structure 405 above cameras 440A-C and cover 430. LIDAR 420 is one example of a ranging sensor based on reflected laser pulsed light. The invention encompasses other ranging sensors such as radar which uses reflected radio waves. In one example, LIDAR 420 is the Puck sensor by VELODYNE LIDAR®.

Continuing to refer to FIGS. 4A-4D, cameras 440A, 440B, 440C can provide digital images of objects, surfaces and structures around autonomous vehicle 121 (FIG. 3B). Cameras 440A, 440B, 440C can receive images through windows 434, 436 and 438 that are mounted in cover 430. Cameras 440A, 440B, 440C can include various kinds of lenses including, but not limited to, fisheye lens 442 (FIG. 4D) camera 444. Fisheye lens 442 can expand the field of view of camera 444 up to, for example, 180°. In some configurations, camera 444 can include a camera similar to e-cam52A_56540_MOD by E-con Systems of San Jose Calif. In some configurations, fisheye lens 442 can include a lens similar to model DSL227 by Sunex of Carlsbad, Calif. Cameras 440A, 440B, 440C can be arranged around structure 405 with respect to cover 430 to fields of view that cover the entire 360° around autonomous vehicle 121 (FIG. 3B).

Continuing to refer to FIGS. 4A-4D, mounting sensor assembly 400 on top of autonomous vehicle 121 (FIG. 3B) can free the sensors of blocking by nearby objects including, but not limited to, people, cars, and low walls. Mounting sensor assembly 400 to the top of autonomous vehicle 121 (FIG. 3B) can provide a substantial and rigid mount that can resist deflections that can be caused by, for example, but not limited to, movement of autonomous vehicle 121 (FIG. 3B). Cover 430 can be sealed from the weather by, for example, but not limited to, an O-Ring between cover 430 and the top of autonomous vehicle 121 (FIG. 3B).

Figure 5A:
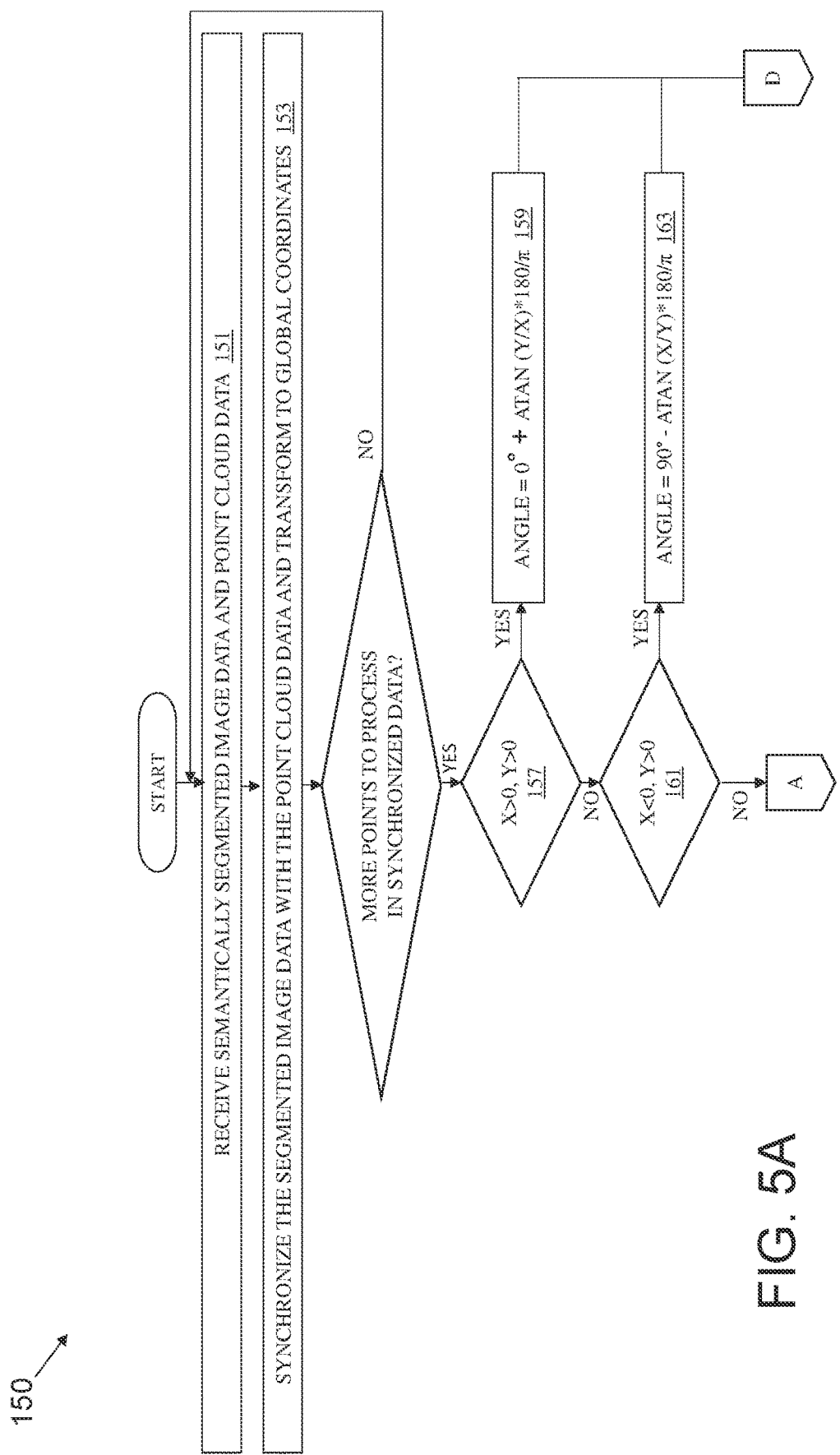
FIGS. 5A-5C are flowcharts of a camera processing method of the present teachings.
Figure 5B:
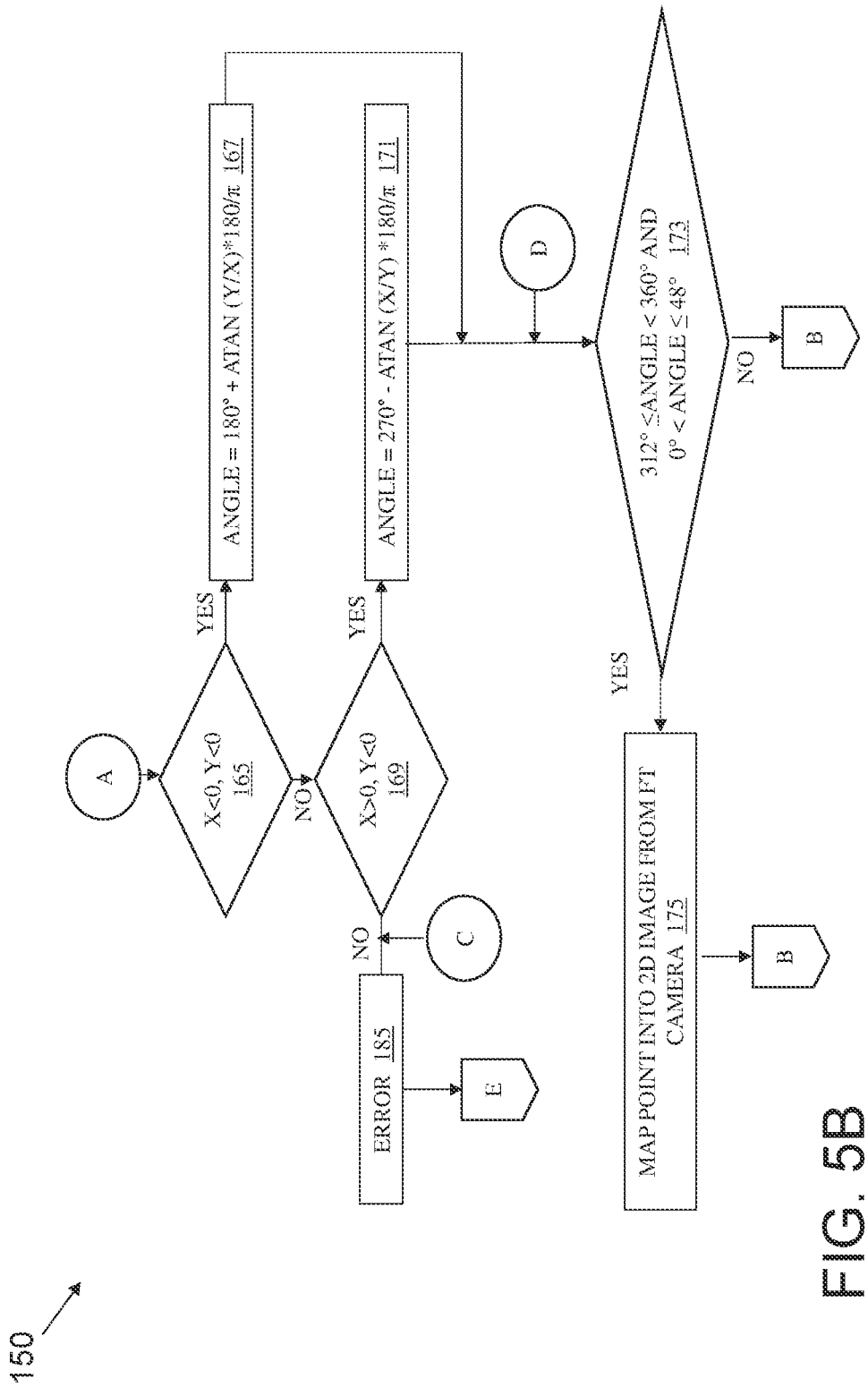
Figure 5C:
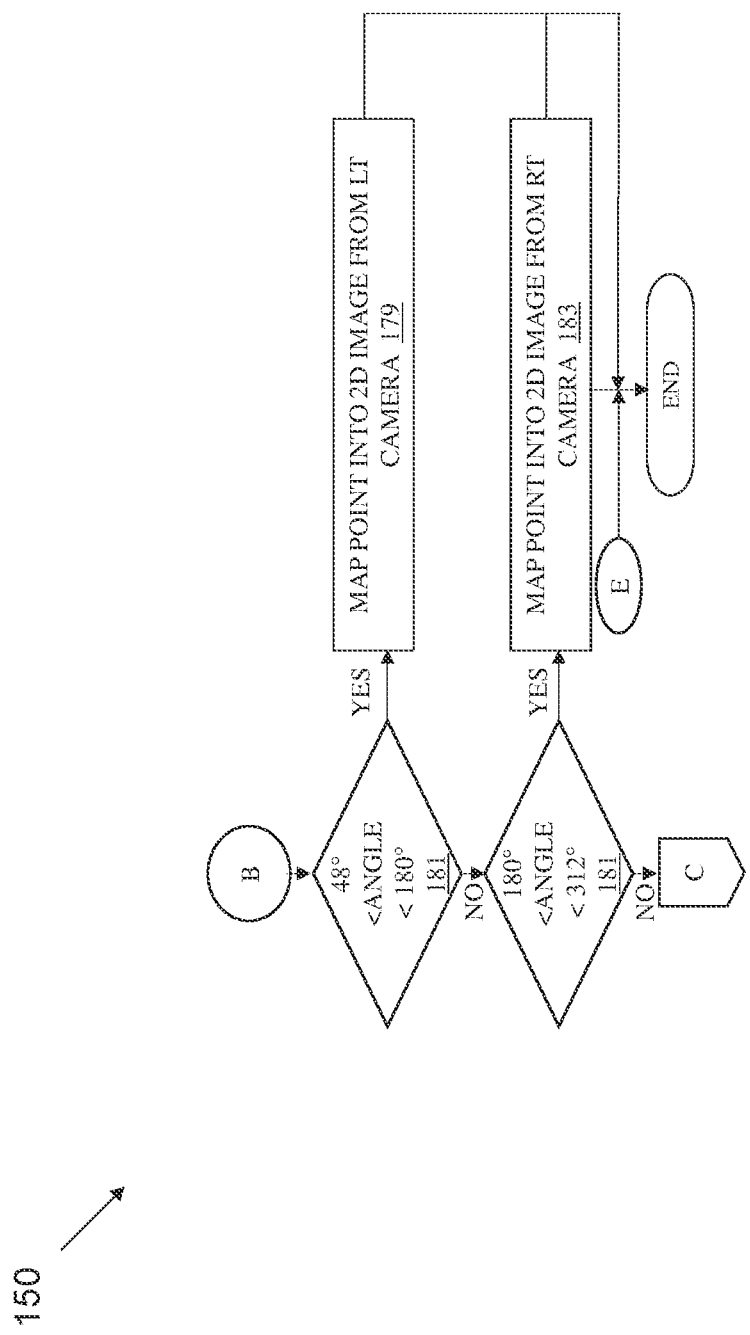

Referring now to FIGS. 5A-5C, method 150 for mapping LIDAR 3D points onto semantically segmented images from multiple cameras can include, but is not limited to including, accessing 151 semantically segmented image data and point cloud data, and accessing 153 a ROS synchronized subscriber that can insure that any data that are received simultaneously have the same time stamp as described herein. The method can include receiving time-synchronized LIDAR points and three images that are outputs from semantic segmentation corresponding to cameras mounted on the front, and to the left and right of the front camera, on a robot, and rotating LIDAR points from the LIDAR coordinate system to the image coordinate system of the cameras. The rotation step produces rotated points in a 3D frame of reference according to a LIDAR image rotation matrix R by applying a roll of −90° and a yaw of −90°. The rotation step can further include applying the rotation matrix R and camera translation factors $t_x/t_y/t_z$ to each of the rotated LIDAR points, to convert the aligned LIDAR points to 3D image points, applying camera rotation matrices r to each of the LIDAR points to align the LIDAR frame with the camera frame, arriving at x/y/z, projecting matrix K from calibration of the cameras, applying the projection matrix K to the 3D image points, arriving at x/y/z, and therefore converting the 3D image points to 2D points: $X_{rgb}=x/z$, $Y_{rgb}=y/z$. Because more than one LIDAR point may have same $X_{rgb}$, $Y_{rgb}$ values, each projected 2D value $X_{rgb}$, $Y_{rgb}$ in the image is populated with the depth of a LIDAR point that is closest to autonomous vehicle 121 (FIG. 3A). In some configurations, the 2D image can include 1920×1080 pixels.

Continuing to refer to FIGS. 5A-5C, method 150 can optionally include wherein computing the LIDAR image rotation R can include, but is not limited to including, computing Euler and Tait-Bryan rotations as combinations of 3-axis rotations ($R_x$, $R_y$, $R_z$). The combined rotation matrix is a product of two or three of the $R_x/R_y/R_z$ matrices.

Continuing to refer to FIGS. 5A-5C, method 150 can include determining the rotation matrices r that can include, but is not limited to including, for each point (X, Y, Z) in the LIDAR point cloud, calculating angle 122 (FIG. 3A) that point 111 (FIG. 3A) subtends with the center of LIDAR 117 (FIG. 3A). If 155 there are more points to process, and if 157 X>0 and Y>0, set 159 angle 122 (FIG. 3A)=0°+atan (Y/X)*180/π. If 161 X<0 and Y>0, set 163 angle 122 (FIG. 3A)=90°−atan (X/Y)*180/π. If 165 X<0 and Y<0, set 167 angle 122 (FIG. 3A)=180°+atan (Y/X)*180/π. If 169 X>0 and Y<0, set 171 angle 122 (FIG. 3A)=270°−atan (X/Y)*180/π, otherwise error out 185. Method 150 can include if 173 angle 122 (FIG. 3A) is between 0° and 48° or angle 122 (FIG. 3A) is between 312° and 360°, mapping 175 point 111 (FIG. 3A) onto the semantic segmentation output image derived from front camera 201A (FIG. 2B). Method 150 can include if 177 angle 122 (FIG. 3A) is between 48° and 180°, mapping 179 point 111 (FIG. 3A) onto the semantic segmentation output image derived from left camera 201B (FIG. 2B). Method 150 includes if 181 angle 122 (FIG. 3A) is between 180° and 312°, mapping 183 point 111 (FIG. 3A) onto the semantic segmentation output image derived from right camera 201C (FIG. 2B). Angle 122 (FIG. 3A) indicates that point 111 (FIG. 3A) falls into the field of view one of cameras 201 (FIG. 2). Transform matrices 221 (FIG. 2) can differ depending upon which of cameras 201 (FIG. 2) that point 111 (FIG. 3A) is mapped.

Configurations of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. Parts of the system can operate on a computer having a variable number of CPUs. Other alternative computer platforms can be used.

The present configuration is also directed to software for accomplishing the methods discussed herein, and computer readable media storing software for accomplishing these methods. The various modules described herein can be accomplished on the same CPU, or can be accomplished on different computers. In compliance with the statute, the present configuration has been described in language more or less specific as to structural and methodical features. It is to be understood, however, that the present configuration is not limited to the specific features shown and described, since the means herein disclosed comprise preferred forms of putting the present configuration into effect.

Methods can be, in whole or in part, implemented electronically. Signals representing actions taken by elements of the system and other disclosed configurations can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form, subject to appropriate licenses where necessary, including, but not limited to, Graphic Interchange Format (GIF), Joint Photographic Experts Group (JPEG), Portable Network Graphics (PNG), Scalable Vector Graphics (SVG), and Tagged Image File Format (TIFF).

While the present teachings have been described above in terms of specific configurations, it is to be understood that they are not limited to these disclosed configurations. Many modifications and other configurations will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A method for estimating free space based on image data and point cloud data, the free space used for navigating an autonomous vehicle, the method comprising:
   semantically classifying the image data based on a machine learning model forming point classifications and point classification probabilities;
   associating each point in the point cloud data to the image data that are spatially co-located with the point cloud data;
   classifying each of the points as an obstructed space or a non-obstructed space based on the spatial association of each of the points with the semantically classified image data forming obstructed points and non-obstructed points;
   forming a grid of the obstructed points and non-obstructed points within a pre-selected area surrounding the autonomous vehicle; and
   estimating the free space in the pre-selected area by associating the obstructed points with a first probability based at least on (1) noise in the point cloud data, (2) a second probability that the point cloud data are reliable, (3) a distance from the non-obstructed points to the obstructed space closest to the non-obstructed points, (4) a third probability that the point classifications are correct, and (5) presence of the non-obstructed space.

2. The method as in claim 1 further comprising:
   receiving the image data and the point cloud data into the autonomous vehicle.

3. The method as in claim 1 further comprising:
   performing a first transform on the points in the point cloud data into an image coordinate system associated with the image data.

4. The method as in claim 3 further comprising:
   performing a second transform on the first transformed points into a robot coordinate system associated with the autonomous vehicle.

5. The method as in claim 1 wherein the image data comprise streaming data from a pre-selected number of at least one camera, the at least one camera providing a 360° view of an area surrounding the autonomous vehicle.

6. The method as in claim 1 wherein the machine learning model comprises an ICNET semantic segmentation model.

7. The method as in claim 1 wherein the machine learning model comprises detecting at least one drivable surface.

8. The method as in claim 7 wherein the at least one drivable surface is selected from a group consisting of road, sidewalk, ground, terrain surfaces, and lane markings.

9. The method as in claim 1 wherein the associating each point comprises:
   receiving the image data at a pre-selected rate; and
   mapping the point cloud data onto the image data.

10. A system for estimating free space based on image data and point cloud data, the free space used for navigating an autonomous vehicle, the autonomous vehicle having a front, a left side, and a right side, the system comprising:
    a pre-processor configured to receive camera image data from at least one camera, the pre-processor configured to semantically classify each pixel of the image data into a classification and calculate a probability associated with the classification, the classification and the probability being determined by a machine learning model; and
    a free space estimator configured to compute an obstacle classification layer, a probability layer, and a log odds layer based on the point cloud data and the image data;
    wherein the free space estimator comprises:
       a 3D point cloud to 3D image processor configured to transform the 3D point cloud to 3D image coordinates;
       a 3D image to 2D RGB transform configured to transform the 3D image coordinates to 2D RGB coordinates; and
       a 2D to 3D baselink transform configured to transform the 2D RGB coordinates to 3D baselink coordinates forming transformed point cloud data.

11. The system as in claim 10 wherein the camera image data comprises streaming data from the at least one camera, the at least one camera providing a 360° view of an area surrounding the autonomous vehicle.

12. The system as in claim 10 wherein a number of the at least one camera comprises three cameras.

13. The system as in claim 10 wherein the machine learning model is configured to detect drivable surfaces, the drivable surfaces including lane markings.

14. The system as in claim 10 wherein the free space estimator is configured to receive data having time stamps into a synchronizer, the synchronizer time-synchronizing the point cloud data, the transformed point cloud data, and the classification based on the time stamps.

15. The system as in claim 10 wherein the 3D point cloud to 3D image processor comprises:
    receiving the point cloud data from at least one LIDAR sensor, the classification and the probability of each point of the point cloud data, and coordinate transforms;

associating each of the points in the point cloud data to the image data that are spatially co-located with the point cloud data; and
performing a first transform on the points in the point cloud data into an image coordinate system associated with the image data.

16. The system as in claim 15 wherein associating each point in synchronized point cloud data with a synchronized image data comprises:
for each of the points (X,Y,Z) in the synchronized point cloud data, calculating an angle that the point subtends with a center of the synchronized point cloud data, the angle indicating a field of view of the at least one camera, the calculating including:
if X>0 and Y>0 then the angle=0°+atan(Y/X) degrees*180/π;
if X<0 and Y>0 then the angle=90°−atan(X/Y) degrees*180/π;
if X<0 and Y<0 then the angle=180°+atan(Y/X) degrees*180/π; and
if X>0 and Y<0 then the angle=270°−atan(X/Y) degrees*180/π;
mapping each of the points onto a semantic segmentation output image including:
if 312°<the angle≤360° or 48°≥the angle>0° then mapping the point onto the semantic segmentation output image derived from the at least one camera located at the front of the autonomous vehicle;
if 48°<the angle<180° then mapping the point onto the semantic segmentation output image derived from the at least one camera located on the left side; and
if 180°<the angle≤312° then mapping the point onto the semantic segmentation output image derived from the at least one camera located on the right side.

17. The system as in claim 10 wherein the 3D image to 2D RGB transform comprises:
identifying each of the points that represents an obstructed space and a non-obstructed space based on a spatial association of the points with the semantically classified image data.

18. The system as in claim 16 wherein the 2D to 3D baselink transform comprises performing a transform on the points into a robot coordinate system associated with the autonomous vehicle.

19. The system as in claim 18 wherein the 3D baselink to grid transform comprises:
flattening robot coordinate system points (Xbl, Ybl, Zbl) to a 2D grid map surrounding the autonomous vehicle, the 2D grid map extending to a pre-selected radius around the autonomous vehicle; and
identifying at least one cell of the 2D grid map as occupied if a semantic segmentation output point (XRGB, YRGB), of the semantic segmentation output image, spatially associated with the at least one cell corresponds to an obstructed space.

20. The system as in claim 19 wherein the semantic segmentation output point (XRGB, YRGB) comprises values including 0=non-drivable, 1=road, 2=sidewalk, 3=terrain, 4=lane marking, >0=drivable, 0=obstructed.

21. The system as in claim 19 further comprising:
a layer processor configured to
classify each of the points that represents a non-obstructed space and an obstructed space within a pre-selected area surrounding the autonomous vehicle, form a spatial grid of obstructed points and non-obstructed points, based on spatial association of the points with the semantically classified image data having point classifications and point probabilities; and
estimate the free space in the pre-selected area by associating the obstructed points with a first probability based at least on (1) noise in the point cloud data, (2) a second probability that the point cloud data are reliable, (3) a distance from the non-obstructed points to the obstructed points closest to the non-obstructed points, (4) a third probability that the point classifications are correct, and (5) presence of the non-obstructed points.

22. The system as in claim 21 wherein the non-obstructed space comprises space that is not part of the obstructed space.

23. The system as in claim 21 wherein the layer processor comprises:
estimating the free space by extending a line from a grid map center of the grid map to a boundary of the pre-selected area; and
along the line, marking the free space as the at least one cell that is not the obstructed space in the grid map between a blind area and a last free space present in the line.

24. The system as in claim 23 wherein the blind area comprises an area surrounding the at least one LIDAR sensor where the point cloud data cannot be gathered.

25. A system for estimating free space based on image data and point cloud data, the free space used for navigating an autonomous vehicle, the autonomous vehicle having a front, a left side, and a right side, the system comprising:
a pre-processor configured to receive camera image data from at least one camera, the pre-processor configured to semantically classify each pixel of the image data into a classification and calculating a probability associated with the classification, the classification and the probability being determined by a machine learning model; and
a free space estimator configured to compute an obstacle classification layer, a probability layer, and a log odds layer based on the point cloud data and the image data;
wherein the free space estimator comprises:
a 3D point cloud to 3D image processor configured to transform the 3D point cloud to 3D image coordinates; and
a 3D image to 2D RGB transform configured to transform the 3D image coordinates to 2D RGB coordinates; and
wherein the 3D image to 2D RGB transform comprises identifying each of the points that represents an obstructed space and a non-obstructed space based on a spatial association of the points with the semantically classified image data.

* * * * *